C. A. PARSONS, S. S. COOK AND L. M. DOUGLAS.
CARBON GLAND.
APPLICATION FILED OCT. 5, 1918.

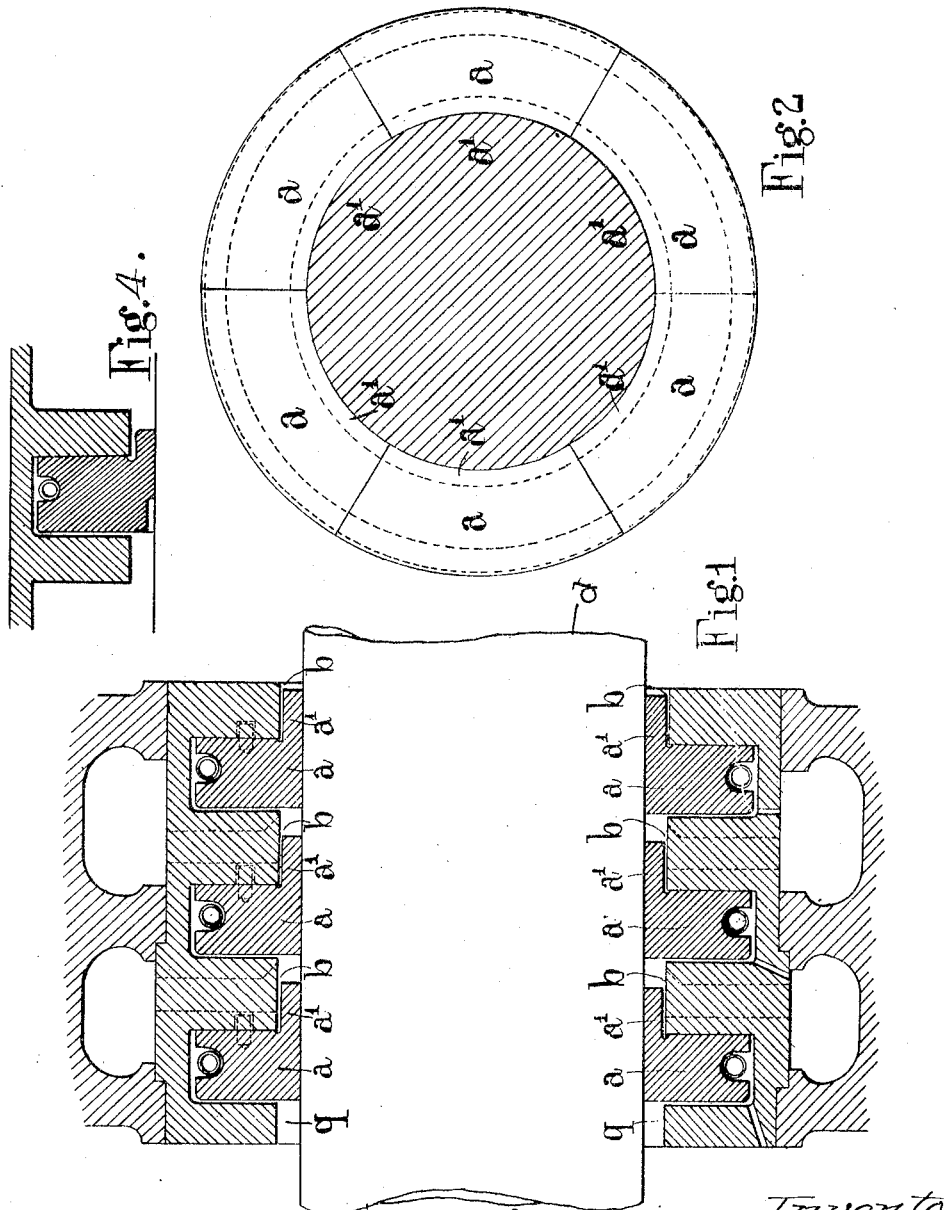

1,331,360.

Patented Feb. 17, 1920.
2 SHEETS—SHEET 2.

UNITED STATES PATENT OFFICE.

CHARLES ALGERNON PARSONS, STANLEY SMITH COOK, AND LOUIS MORTIMER DOUGLAS, OF NEWCASTLE-UPON-TYNE, ENGLAND; SAID COOK AND SAID DOUGLAS ASSIGNORS TO SAID PARSONS.

CARBON GLAND.

1,331,360.        Specification of Letters Patent.        Patented Feb. 17, 1920.

Application filed October 5, 1918. Serial No. 257,080.

*To all whom it may concern:*

Be it known that we, CHARLES ALGERNON PARSONS, K. C. B., STANLEY SMITH COOK, and LOUIS MORTIMER DOUGLAS, all subjects of the King of Great Britain and Ireland, and all residing at Heaton Works, Newcastle-upon-Tyne, in the county of Northumberland, England, have invented certain new and useful Improvements in Carbon Glands, of which the following is a specification.

This invention relates to carbon glands for packing rotating shafts and has for its object to produce a carbon gland-ring capable of sustaining higher pressures than have been hitherto carried and having greatly reduced friction while being more reliable than has hitherto been the case with such gland-rings.

Carbon glands as heretofore designed consist of rings, each ring being made up of sectors of graphitic carbon usually of rectangular cross section, embracing the rotating shafts and held together by a spring encircling them, the purpose of such carbon gland-ring being to baffle the flow of steam from a higher pressure on one side of it to a lower pressure on the other. The outer periphery of the gland-ring is in such case subjected over its whole area to the higher pressure, while its inner periphery, which is in contact with or is bored to fit the surface of the shaft, is subject to a lower average pressure owing to the fall of pressure from the high pressure side to the low pressure side. It follows, therefore, that there is a radial inward force on the ring pressing it toward the shaft, thus giving rise to friction, absorbing power and producing a corresponding amount of heat.

The present invention consists broadly in constructing gland-rings in such a manner that they are substantially in radial equilibrium under the steam pressure.

The invention further consists in forming the gland-rings of L shape with the extension along the shaft toward the low pressure side, a space being provided between the back of the extended portion and the housing of the gland-ring, which space is exposed to the lower pressure.

The invention also consists in the improved carbon glands hereinafter described.

Referring to the accompanying drawings:—

Figure 1 shows a section through a carbon packed gland having two lantern spaces or leak off chambers and three segmental rings each in a separate groove;

Fig. 2 shows in end view one of the three segmental carbon rings of Fig. 1;

Fig. 4 shows a very thick segmental carbon ring in which the surface in contact with the rotating shaft is relieved at the high pressure end to reduce the area in contact and yet maintain the strength of the segments;

Figure 3:
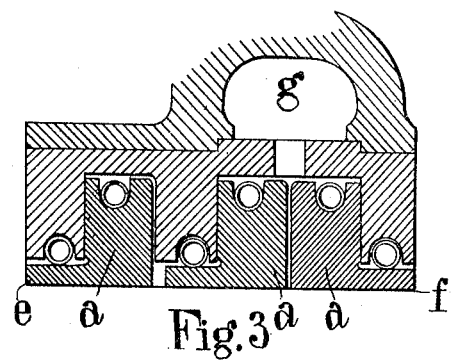
Fig. 3 shows in part section a gland with three segmental carbon rings arranged with two of the rings in a wide groove and one lantern space, the modification being designed to make the gland suitable for pressure drop in either or both directions.

In carrying the invention into effect according to one example shown in Figs. 1 and 2, the gland is made up of a number of L shaped pieces $a\ a\ a$ with extensions $a'\ a'\ a'$ lying along the shaft toward the low pressure side. A space $b$ is allowed between the housing of the gland and the back of the extended portion of each carbon sector, and this space is exposed to the low pressure. In this manner while retaining the same width of ring (in an axial direction) as would normally exist in an ordinary ring of rectangular section the inward pressure of the steam on the gland-ring may be made substantially equal to the outward pressure, there being high pressure over the periphery of the gland-ring on the high pressure side and low pressure over the back of the extension on the low pressure side, these two pressures acting against the outward radial pressure which varies along the shaft from the higher to the lower value. The rotating shaft is shown at $c\ d$, and $c$ is the high pressure and $d$ the low pressure end.

Where the direction of steam flow is in both directions the arrangement shown in Fig. 3 is applicable. In this case the toes or projections of the carbon segment rings are pointed in opposing directions and two rings *a a* may be conveniently contained in one wide groove, while a third single ring is contained in a narrower single groove. This arrangement is suitable for a vacuum at the end *e* with low or atmospheric pressure at the end *f*. In such cases it is desirable to admit live steam to the pocket *g* and maintain a pressure there slightly in excess of atmospheric to preclude the possibility of ingress of air to the turbine and condenser.

In the modification shown in Fig. 4 the actual packing part of the ring is the portion to the right of the dotted line, the remaining portion is cleared from the surface of the shaft. This is in order that the ring may be made thick to give greater rigidity to the segments without increase in the bearing surface and consequent friction.

Figure 7:
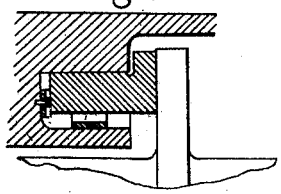
Figs. 7 and 8 show carbon packing rings in which contact is made with the face of a collar upon the shaft.
Figure 8:
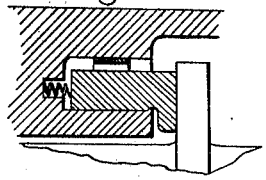
Figure 6:
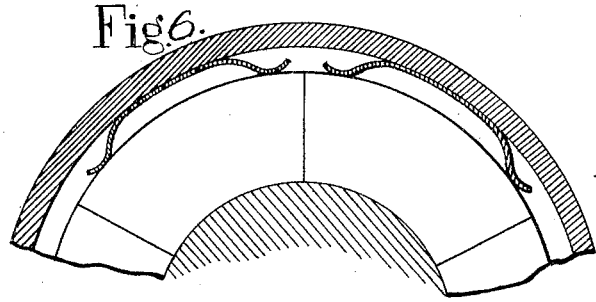
Figs. 5 and 6 show in part longitudinal and part transverse section wave springs to be employed to press on the carbon instead of "garter springs"
Figure 5:
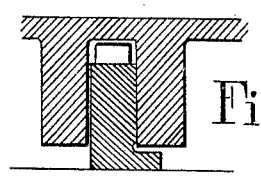

Figs. 5 and 6 show wave springs and Figs. 7 and 8 show the invention modified to pack the face of a collar, the ring segments being thrust axially.

By means of the invention the rings are substantially in equilibrium in the radial direction under the steam pressure so that friction against the shaft is reduced and higher steam pressures across the gland-rings can be allowed.

In consequence of the reduced friction and reduced heating a more reliable gland is obtained.

It is usually preferable to leave a slight balance of pressure in the inward radial direction to assist the encircling spring in keeping the carbon sectors in place. This spring may be placed either around the outer periphery of the ring or around the periphery of the extended portion of the ring.

The use of an encircling spring is not essential as the carbon rings may be held together by any other suitable means.

Where in the appended claims it is stated that the extension of the segment projects toward the low pressure end of the shaft this statement is made in a broad sense to include the structure of Figs. 1 to 6, in which the extension projects parallel with the axis of the shaft, or as shown in Figs. 7 and 8, in which the extension projects in a plane transverse to the axis.

Having now described our invention, what we claim as new and desire to secure by Letters Patent is:—

1. In carbon and like glands for rotating shafts, a segmental packing ring having its segments divided from each other substantially radially and provided each with an extension projecting toward the low pressure end of the shaft so that the packing rings are in substantially radial equilibrium while under steam pressure as and for the purpose hereinbefore described.

2. In carbon and like glands for rotating shafts, a segmental packing ring having its segments divided from each other substantially radially, each segment having an extension projecting toward the low pressure end of the shaft in a direction parallel with the axis of the shaft, so that the packing rings are in substantially radial equilibrium while under steam pressure, substantially as described.

3. In carbon and like glands for rotating shafts as claimed in claim 1, arranging a plurality of the L section segmental packing rings with extensions placed in opposite directions to make the gland suitable for pressure drop in either or both directions while yet maintaining tightness of the gland as a whole.

4. In carbon and like glands for rotating shafts as claimed in claim 1, arranging two L section segmental packing rings in one groove with the extensions placed in opposite directions to make the gland suitable for pressure drop in either or both directions while yet maintaining tightness of the gland as a whole, substantially as described.

5. In carbon and like glands for rotating shafts as claimed in claim 1, a gland ring of thick section having a large portion of the internal periphery cleared from the shaft at the high pressure end of the ring, substantially as described.

6. In carbon and like glands for rotating shafts as claimed in claim 1, providing means of preventing tilting of the gland-rings such as are shown and described with reference to Figs. 4, 5, 6, 7, and 13 of the accompanying drawings.

7. In carbon and like glands for rotating shafts as claimed in claim 1, a gland-ring of thick section such as is shown in Figs. 4 and 8 with a short extension (*a'*) and a large part of the inner surface cleared from the shaft at the high pressure end of the ring for the purposes hereinbefore described.

8. Carbon and like glands as claimed in claim 1, constructed as shown in the accompanying drawings Figs. 1 to 13 inclusive.

In testimony whereof we have signed our names to this specification.

CHARLES ALGERNON PARSONS.
STANLEY SMITH COOK.
LOUIS MORTIMER DOUGLAS.